United States Patent [19]

Kamner

[11] 4,040,308
[45] Aug. 9, 1977

[54] PULL ROD ASSEMBLY

[75] Inventor: Haim J. Kamner, Palatine, Ill.

[73] Assignee: Goodman Equipment Corporation, Chicago, Ill.

[21] Appl. No.: 651,819

[22] Filed: Jan. 23, 1976

[51] Int. Cl.² ............................................. G05G 3/00
[52] U.S. Cl. ....................................................... 74/586
[58] Field of Search ................. 74/586, 149, 150, 153, 74/154, 155, 817, 826

[56] References Cited

U.S. PATENT DOCUMENTS

| 928,805 | 7/1909 | Shiray et al. | 74/586 X |
| 3,030,935 | 4/1962 | Hanes | 74/154 X |
| 3,367,279 | 2/1968 | Crowe | 74/586 X |
| 3,530,740 | 9/1970 | Turner | 74/586 |

FOREIGN PATENT DOCUMENTS 974,167  11/1964  United Kingdom .................. 74/586

Primary Examiner—Samuel Scott
Assistant Examiner—Lance W. Chandler
Attorney, Agent, or Firm—Fitch, Even, Tabin & Luedeka

[57] ABSTRACT

A pull rod assembly is disclosed which includes telescoping inner and outer rod members one of which is adapted for connection to a drive member and the other of which is adapted for connection to a driven member. A pair of movable pawls are carried by the outer rod member and are operable to interlock with the inner rod member to maintain the rod members in selected axial positions relative to each other. Control means are operative to effect selective release of the pawls such that the overall length of the pull rod assembly may be varied while the driven rod member is subjected to a reciprocating motion from the drive member.

10 Claims, 7 Drawing Figures

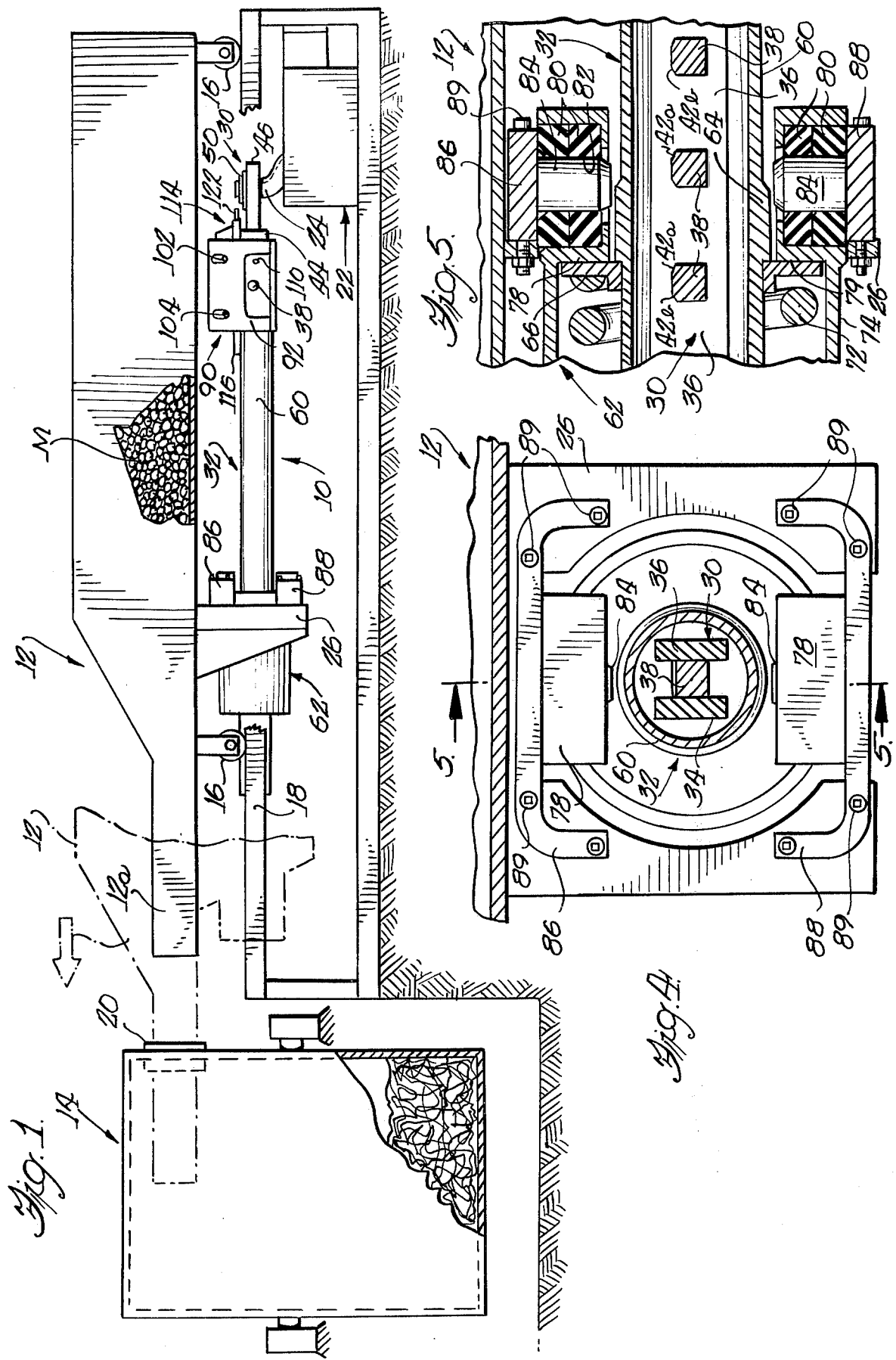

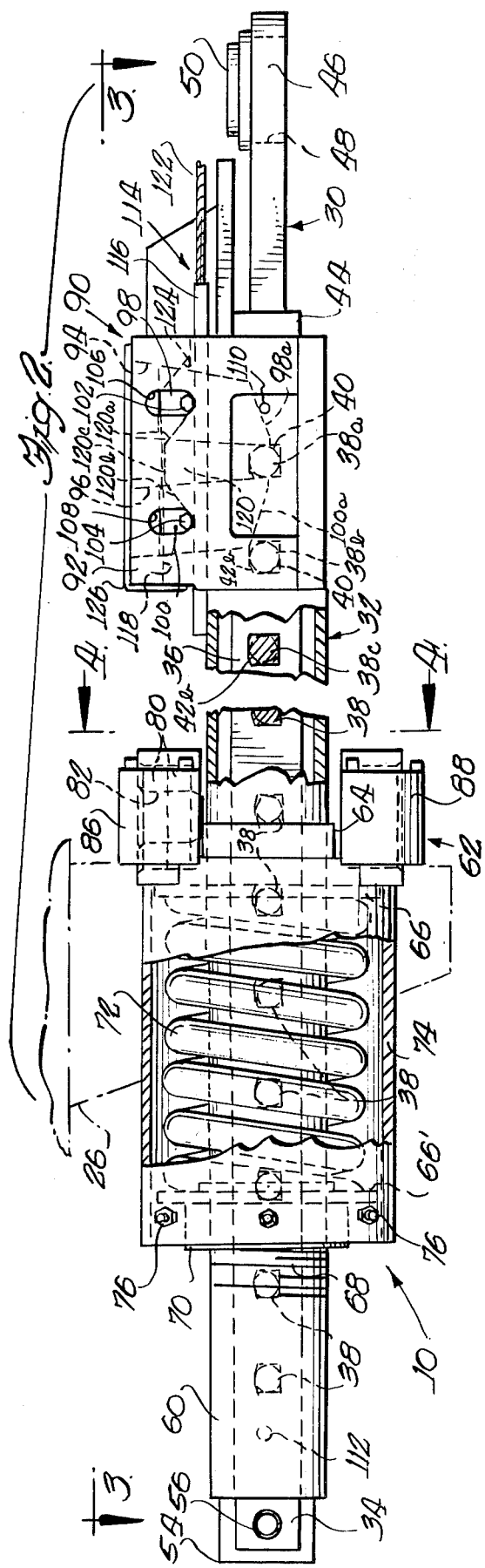
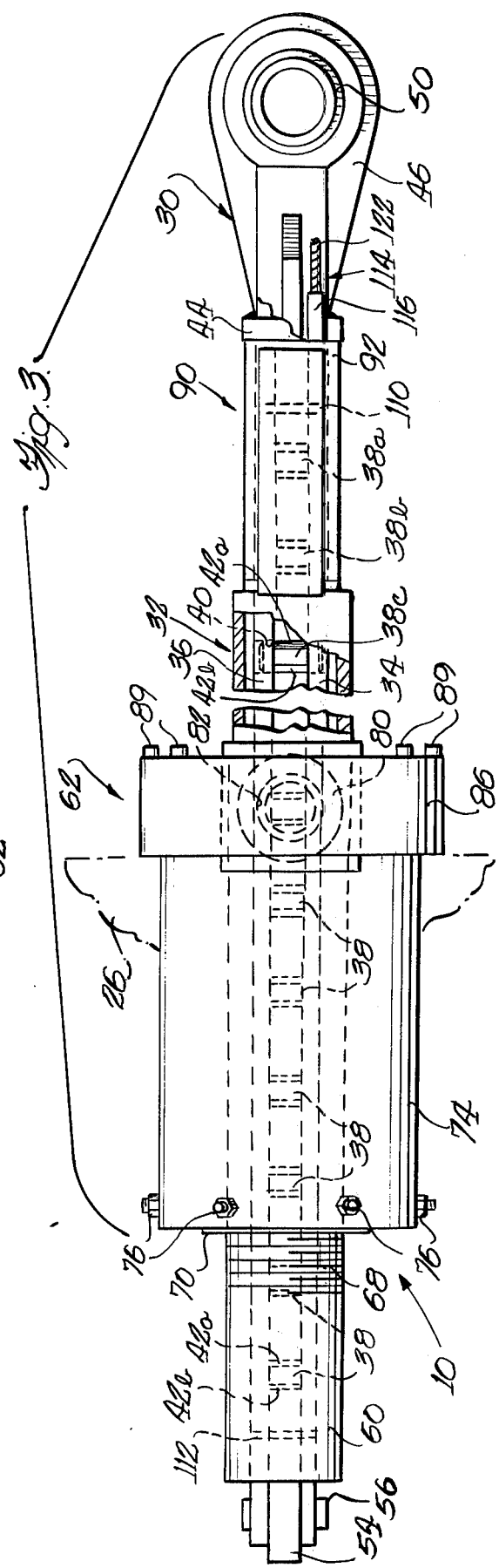

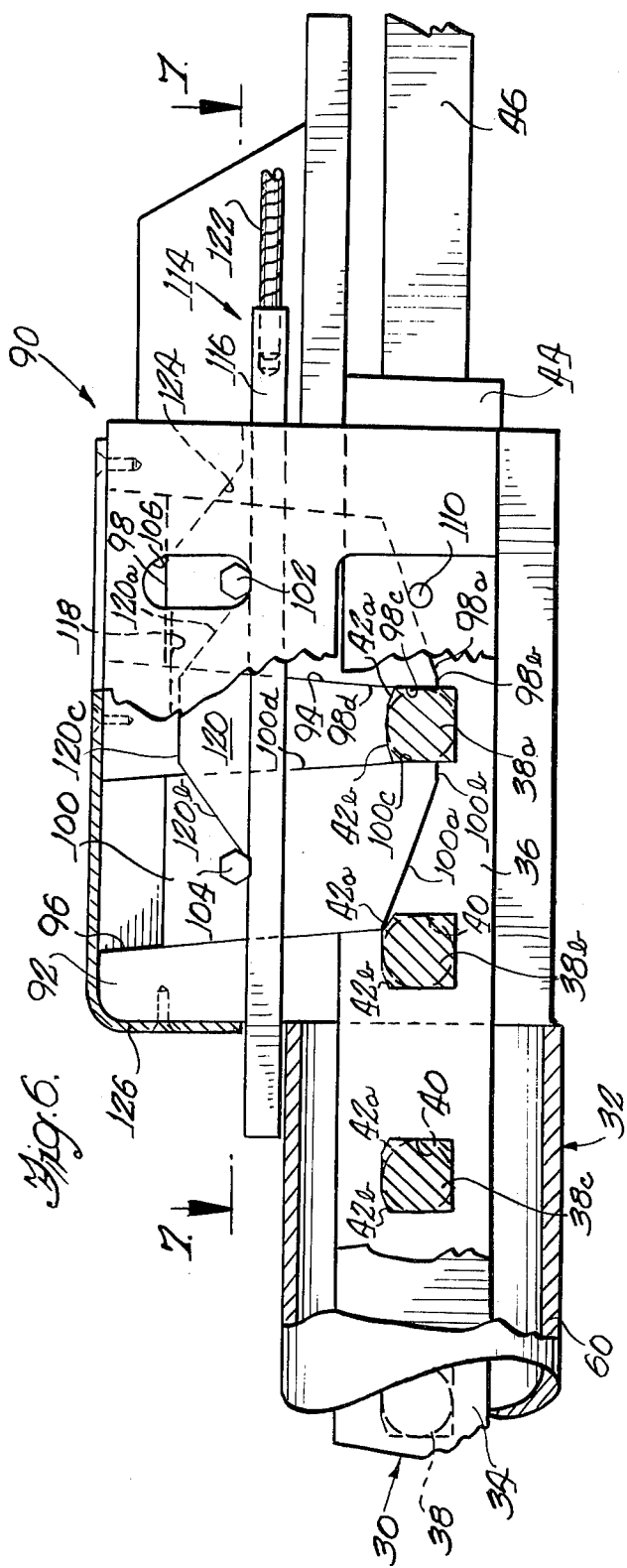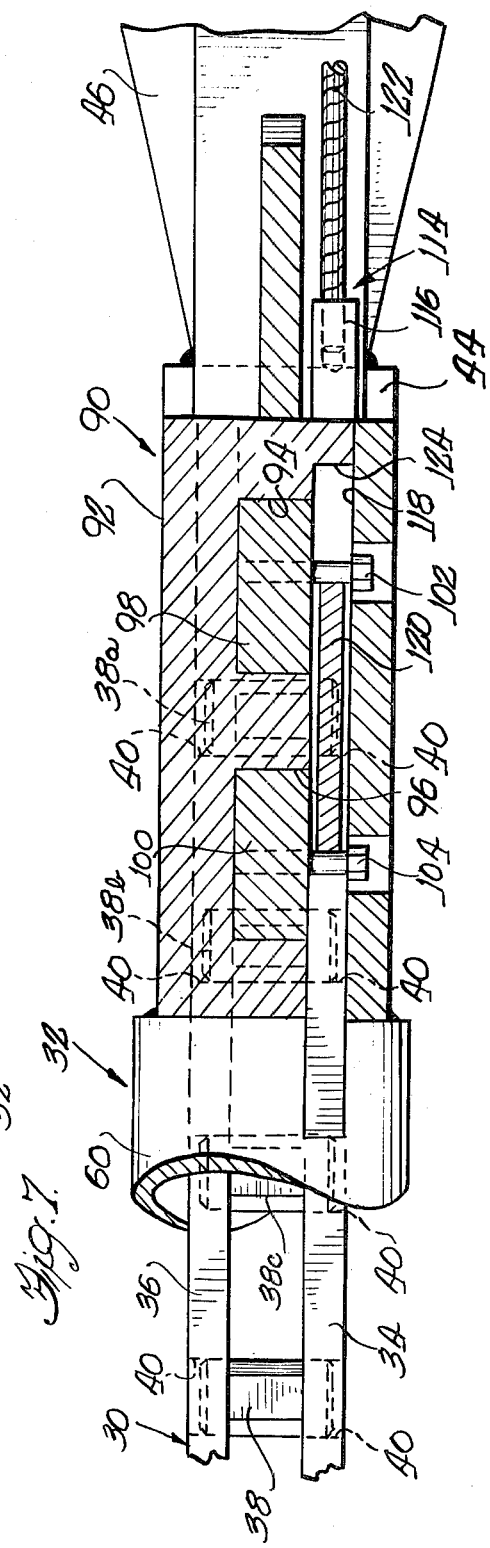

PULL ROD ASSEMBLY

The present invention relates generally to pull rod assemblies, and more particularly to a novel pull rod assembly for connecting a drive member, such as a shaker conveyor drive, to a driven member, such as a conveyor trough, and which includes a pair of pull rods having means for selectively interconnecting the rods to facilitate relative extension or telescoping therebetween while one of the rods is subjected to an axial reciprocating movement by the drive member.

It is frequently necessary in industrial manufacturing processes to transfer materials from a first work station or loading area to a second work station or processing apparatus spaced from the loading area. For example, it is a conventional practice in industrial furnace chargers to laod a furnace charge onto a transfer container or conveyor trough at a loading station, whereat the container trough may receive a load of process batch material, and thereafter move the container trough to a process vessel such as a furnace. The furnace conventionally has an access door through which the forward end of the container trough is projected during discharge of the process material into the furnace.

In some commercial furnace charging systems, after the container trough has been moved to a discharge position relative to the furnace, the container trough is caused to reciprocate longitudinally, as by a shaker drive, such that the process material is discharged from the container trough into the furnace. After discharge, the shaker drive is stopped and the container trough is retracted to the material loading station preparatory to further charging of the furnace. A number of problems exist with these known furnace charging systems, among which is the fact that the furnace door is open for an excessive time period, thereby permitting pollution gases to escape from the furnace. Additionally, power sources are required both for the transfer means which moves the conveyor trough to and from the furnace, and for the shaker drive which effects reciprocating shaking movement of the trough to effect discharge of the process material into the furnace. The associated fluid pressure power cylinders, fittings, conduits and other accessories which are needed in these known systems greatly increase the cost of such systems, often making them economically prohibitive.

One of the primary objects of the present invention is to provide a novel pull rod assembly which may be employed between a drive member and a driven member to effect movement of the driven member in response to movement of the drive member, the pull rod assembly employing first and second rod members disposed in generally juxtaposed relation and having means for selectively interconnecting the rod members so as to effect extension or foreshortening of the overall length of the rod assembly as one of the pull rods is caused to reciprocate by the drive member.

Another object of the present invention is to provide a new and novel pull rod assembly which employs inner and outer telescoping pull rod members and has connecting means carried by one of the pull rods for selective interlocking relation with the other of the pull rods, and which further includes control means for effecting selective interengagement between the pull rod members so that an object connected to one of the pull rods may be caused to move in a linear direction as the other pull rod is caused to reciprocate.

Another object of the present invention is to provide a novel pull rod assembly employing telescoping inner and outer pull rod members and having pawl elements carried by one of the rod members for selective interlocking relation with rungs carried by the other of the rod members, the pawl elements being selectively operable to enable either extension or retraction of the pull rod members relative to each other while preventing relative movement between the rod members in a direction opposite to the desired extension or retraction movement.

A feature of the present invention lies in the provision of a novel pull rod assembly which finds particular application in moving a container trough for a furnace charger and the like, wherein the pull rod assembly is operative to effect movement of the container trough to a discharge position within a furnace and immediately effect reciprocation of the conveyor trough to effect discharge from the trough without the need for auxiliary control mechanism as required by the known furnace charging systems.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a side elevational view illustrating a furnace charging system employing a pull rod assembly in accordance with the present invention;

FIG. 2 is a foreshortened side view of the pull rod assembly of FIG. 1, being shown on an enlarged scale with portions broken away to better illustrate the various elements;

FIG. 3 is a top view of the pull rod assembly of FIG. 2, being taken substantially along the line 3—3 of FIG. 2, looking in the direction of the arrows;

FIG. 4 is a transverse sectional view taken substantially along the line 4—4 of FIG. 2, looking in the direction of the arrows;

FIG. 5 is a partial sectional view taken substantially along line 5—5 of FIG. 4;

FIG. 6 is an enlarged side view of a portion of the pull rod assembly of FIG. 2, with portions being broken away for clarity; and FIG. 7 is a sectional view taken substantially along the line 7—7 of FIG. 6.

Referring now to the drawings, and in particular to FIG. 1, a pull rod assembly in accordance with the present invention is indicated generally at 10. The pull rod assembly 10, which may alternatively be termed an extensible actuator rod assembly, is illustrated, by way of example, in conjunction with a furnace charging container trough, indicated generally at 12. The furnace charging container or conveyor trough 12 is of conventional design and is open at its top and forward ends so as to receive a process material batch "M" therein which is to be discharged into a processing vessel, indicated generally at 14, such as a furnace or the like. The container trough 12 is supported on forward and rear pairs of rollers 16 which are guided on rails or guide ways 18. The pull rod assembly 10 is operative to move the container trough 12 between a rearward loading position spaced outwardly from the process vessel 14, as shown in solid lines in FIG. 1, and a forward discharge position, as shown in phantom in FIG. 1, wherein a forward end 12a of the container trough 12 is received through a door 20 in the process vessel 14 for discharging the process material batch from the container trough into the process vessel.

In the illustrated embodiment, a shaker drive, indicated generally at 22, is supported beneath and centrally between the rails 18 and has an eccentric output crank arm 24 rotatably driven about a vertical axis. The output crank arm 24 is connected to one end of the pull rod assembly 10 as will be described more fully hereinbelow. The pull rod assembly 10 is also connected to the container trough 12 through a bracket assembly 26 so that energizing the shaker drive 22 to effect rotation of the crank arm 24 will effect movement of the container trough in response to operation of the shaker drive. The shaker drive 22 may be of the type disclosed in copending application, Ser. No. 553,437, filed Feb. 27, 1975, and assigned to the assignee of the present invention. As will become apparent hereafter, the pull rod assembly 10 may be used to interconnect other types of drive mechanisms to driven members so as to effect movement of the driven members in response to the drive members.

As noted, in furnace charging systems of known design, the furnace charging container trough 12 is moved from a loading position to a discharge position within the process vessel 14 by a first operating mechanism, such as a fluid pressure operated actuating cylinder, and a second operating mechanism, such as a shaker drive connected to the container trough, is employed to effect longitudinal reciprocation of the container trough in a manner to discharge the process material from the trough. These known systems thus require primary movers and associated control systems to effect movement of the container troughs to discharge positions and thereafter retract the container troughs to load stations. Additionally, the known systems require secondary movers and associated controls for reciprocating the container troughs in a manner to effect discharge into the process vessels. The prior systems also require means for locking the container troughs in both their forward discharge and rear loading positions. The requirements that the container trough be released from its loading position, moved to a discharge position relative to the process vessel, locked in the discharge position, longitudinally reciprocated to effect discharge of the process material into the processing vessel, and thereafter unlocked from its forward position and returned to a loading position, create a substantial time lapse which leads to substantial operating costs and results in a correspondingly increased time period during which the process vessel door is open to allow escape of pollutant gases.

In accordance with the present invention, the pull rod assembly 10 in cooperation with the shaker drive 22 serves to effect movement of the container trough 12 from a loading position to a discharge position relative to the process vessel, immediately effect reciprocating movement of the container trough to discharge the process batch from the container trough, and thereafter return the container trough to its loading position, all with a single power input to the shaker drive 22. Substantial time is saved by elimination of the various aforementioned steps required in the prior known furnace charging systems, with particular saving in time during which the process vessel door is open being realized.

Referring to FIG. 2, taken in conjunction with FIGS. 2–4, the pull rod assembly 10 includes a first pull rod member, indicated generally at 30, which may be termed the inner pull rod member, and a second pull rod member, indicated generally at 32, which may be termed the outer pull rod member. The inner pull rod member 30 includes a pair of elongated rectangular plates 34 and 36 which are of equal length and affixed together in spaced parallel relation by a plurality of rungs 38 secured in normal relation to and between the plates 34 and 36. The rungs 38 are equidistantly spaced along the longitudinal lengths of the plates 34 and 36 with the centers of the rungs intersecting the longitudinal axes of the plates. The rungs 38 are spaced apart a distance slightly less than the stroke or "throw" of the output crank arm 24 of the shaker drive 22 or other similar drive means with which the pull rod assembly 10 may be employed. Each rung 38 has axial cylindrical end portions which are received within axially aligned bores 40 within the plates 34 and 36, each of the rungs being suitably secured to the associated plates as by welding. Each of the rungs 38 has a generally square cross section intermediate its cylindrical ends so that the square portion is disposed between the plates 34 and 36. The upper lateral edges of each portion of the rungs 38 disposed between the plates 34 and 36 are inclined or chamfered at 42a and 42b to provide surface contact rather than edge line contact with pawls to be described hereinbelow. The beveled or chamfered edge surfaces 42a and 42b are preferably inclined downwardly from their upper horizontal surfaces at angles of approximately 18 degrees and intersect the upper horizontal surfaces of the respective rungs approximately ¼ inch from the associated vertical side surfaces.

The inner pull rod member 30 has a rectangular stop plate 44 secured to the right-hand ends of the plates 34 and 36 by welding or other suitable means. The stop plate 44 serves to limit axial telescoping movement of the inner pull rod member 30 relative to the outer pull rod member 32 as will become more apparent hereinbelow. A connecting plate 46 is secured to the stop plate 44 such that the median plane of the connecting plate 44 is perpendicular to the parallel planes of the plates 34 and 36 and extends axially outwardly from the ends of the plates 34 and 36. The connecting plate 46 has a suitable opening 48 therein which receives an annular bearing or bushing 50 for connecting the right-hand end of the inner pull rod to a drive means such as the output crank 24 of the shaker drive 22.

A rectangular stop plate 54 is secured to and between the ends of plates 34 and 36 of the inner pull rod member 30 opposite the stop plate 44 thereof. The stop plate 54 is supported by a support pin 56 received through suitable axially aligned apertures in the plates 34 and 36. The stop plate 54 serves to limit axial movement of the inner pull rod member 30 relative to the outer pull rod member 32 when the pull rod members are moved to effect maximum extension of the pull rod assembly 10 as will be described more fully below.

The inner pull rod member 30 is telescopingly received within the outer pull rod member 32. To this end, the outer pull rod member 32 includes a cylindrical tubular body 60 which has an inner diameter of sufficient size to allow free sliding axial movement of the inner pull rod member 30 therethrough. The outer pull rod member 32 has connecting means, indicated generally at 62, supported thereon for connecting the outer pull rod member to the container trough 12 or to another selected driven member. With particular reference to FIGS. 2–5, the tubular body 60 has an annular ring 64 secured to its outer surface as by welding, the ring 64 serving as an abutment against which an annular spring guide 66 normally abuts. The tubular body 60 is externally threaded at 68 to threadingly receive an annular spring setting nut 70 which may be moved longitudinally along the threaded portion 68 and is selectively affixed thereto by a set screw (not shown). The nut 70 serves as abutment means for an annular spring guide 66' which is a mirror image of the spring guide 66. A coil compression spring 72 is disposed between the spring guides 66 and 66' coaxial with the tubular body 60.

A tubular shell 74 is coaxial with the compression spring 72 and has a pair of diametrically opposed bushing support blocks 78 secured thereon which have surfaces 79 adapted to abut the spring guide 66 as shown in FIG. 5. The end of the tubular shell 74 opposite the bushing blocks 78 has a plurality of nut and bolt sets 76 (FIGS. 3 and 4) supported peripherally thereabout, the heads of the bolts extending interiorly of the shell 74 and serving as abutment means for the associated spring guide 66'. The outer pull rod tube 60 is thus capable of longitudinal movement relative to the shell 74 when subjected to a force sufficient to overcome the axial compression force rating of the selected compression spring 72.

The support blocks 78 receive pairs of annular rubber or elastomer bushings 80 which have axially aligned openings 82 therethrough to receive trunion pins 84 secured to associated upper and lower pivot frames 86 and 88, respectively. The upper and lower pivot frames 86 and 88 are secured, as by bolts 89, to the bracket 26 which, in turn, is fixedly secured to the lower surface of the container trough 12 as best illustrated in FIG. 1. In this manner, the outer pull rod member 32 is pivotally connected to the container trough 12 about a vertical pivot axis disposed normal to the lower surface of the container trough 12. By so pivotally connecting the outer pull rod member 32 to the container trough 12, the pull rod assembly 10 may undergo motion in a horizontal plane about the pivot axis defined by the trunion pins 84 while also undergoing axial reciprocating movement which is transmitted to the container trough 12.

The pull rod assembly 10 includes connecting means, indicated generally at 90, for selectively connecting the outer pull rod member 32 to the inner pull rod member 30 when the inner and outer pull rod members are in various extended or retracted telescoping positions relative to each other. In the illustrated embodiment, the connecting means 90 is supported by the outer pull rod member 32 and includes a pawl housing 92 of generally rectangular configuration affixed to the right-hand end of the tubular body 60 as by welding. The pawl housing 92 has a pair of pawl receiving slots 94 and 96 formed therein, the center axes of the pawl receiving slots being inclined toward each other by angles of approximately 5 degrees from vertical, as best seen in FIGS. 2 and 6. The pawl receiving slots 94 and 96 are generally rectangular in transverse section and slidingly receive identically shaped pawls 98 and 100 therein such that the pawls may be moved axially within their respective pawl receiving slots. Each of the pawls 98 and 100 has a lower inclined cam surface 98a and 100a, respectively, thereon which subtends an angle of approximately 18 ½° from a line drawn perpendicular to the longitudinal axis of the associated pawl. The cam surfaces 98a and 100a terminate at their lower ends in surfaces 98b and 100b which lie in planes normal to the longitudinal axes of the associated pawls 98 and 100 and serve to eliminate pointed edges which would result in excessive wear on the rungs 38. The pawls 98 and 100 further have beveled surfaces 98c and 100c, respectively, formed thereon contiguous to the respective surfaces 98b and 100b and which subtend angles of approximately 5° with the associated adjacent edge surfaces 98d or 100d on the pawls. The surfaces 98c and 100c establish area surface contact between the pawls and the rungs 38 for reducing wear on the vertical side surfaces of the rungs.

Each pawl 98 and 100 further has a lift pin or bolt 102 and 104, respectively, secured thereto in normal relation and extending outwardly through an associated elongated slot 106 and 108, respectively, in the pawl housing 92. The lift pins 102 and 104 and the associated slots 106 and 108, respectively, are configured to facilitate upward and downward sliding movement of the pawls 98 and 100 within their respective pawl slots 94 and 96 during operation of the control means 90 as will become more apparent below.

The pawls 98 and 100 have widths, considered as the dimension perpendicular to the major axes of the pawls in the planes of FIGS. 2 and 6, slightly greater than the distance between each pair of opposing vertical side surfaces of adjacent rungs 38. In this manner, if a pawl is free to fall by gravity within its respective pawl slot, at least a portion of its lower surfaces 98a, 98b or 100a, 100b will engage one of the rungs 38 to limit downward travel of the pawl. The pawls are thus prevented from becoming wedged between adjacent rungs 38 on the inner pull rod member 30. The pawls are spaced apart such that when a rung 38 is disposed midway therebetween, the pawls will move to positions as shown in FIG. 6 wherein the pawl cam surfaces 98a and 100a will engage the next adjacent rungs 38, with the pawl surfaces 98c and 100c engaging opposite vertical side surfaces of the centered rung 38 and preventing axial movement of the outer pull rod relative to the inner pull rod. The engaged cam surfaces 98a and 100a facilitate upward riding of the pawls on the associated rungs during operation as hereinafter described.

The plate 34 of the inner pull rod 30 has outwardly projecting pins 110 and 112 provided adjacent the opposite ends thereof to underlie the lower cam surface of an associated one of the pawls 98 and 100 when the inner and outer pull rod members are in their fully retracted and fully extended relative positions whereby to prevent forcible wedging of the pawls with the end rungs 38.

Control means, indicated generally at 114, is supported within the pawl housing 92 and is operable to selectively raise or release either of the pawls 98 and 100 from its interlocking relation with a rung 38 on the inner pull rod member 30 so as to facilitate relative extension or retraction of the pull rod members. The control means 114 includes a pawl release bar 116 which is supported by and longitudinally movable within a channel 118 in the pawl housing 92. The pawl release bar 116 has a generally centrally disposed lift cam 120 provided thereon which defines lift cam surfaces 120a and 120b. The control means 114 includes an actuator bar or control cable, indicated at 122 in FIGS. 1, 2 and 6, which is secured to the pawl release bar 116 and is operative to effect longitudinal movement of the pawl release bar in a manner to effect selective engagement of the cam surface 120a or 120b with the associated pawl lift pins 102 or 104, respectively. The lift cam 120 is configured so that when the lift cam is centered between the pawls 98 and 100, both pawls and their associated lift pins 102 and 104 are free to move downwardly by gravity to positions wherein they engage either rungs 38 or the limit pins 110 and 112 on the inner pull rod, depending upon the positions of the inner and outer pull rods relative to each other. The lift cam surfaces 120a and 120b subtend upward angles of incline of approximately 55° with the planar upper surface of the bar 116.

It will be understood that rather than the manually operable actuator bar or control cable 122 to effect shifting of the pawl release bar 116, automatic shift control means may be provided to selectively release the pawls 98 and 100 from the rungs 38 of the inner pull rod member 30. For example, conventional circuit control switches and limit switches (not shown) may be mounted on the pawl housing 92 and connected in an electrical control circuit. The control circuit would include at least one solenoid having an actuator plunger connected to the release bar 116. One or more control switches would be connected in circuit with the solenoid to enable selective energizing of the solenoid to establish an initial position of the release bar 116 raising either of the pawls 98 or 100 depending upon whether it was desired to extend or reduce the length of the pull rod assembly. Limit switches, actuated by the means carried on the inner pull rod, would serve to effect return of the release bar 116 to its central position wherein the inner and outer pull rods are interlocked, or would energize the solenoid in a manner to reverse the position of the release bar when the inner and outer pull rod members reach either their fully extended or fully retracted positions. The limit switches could also be employed to control the main power source to stop operation at a predetermined position of the container trough.

Having thus described a preferred embodiment of the pull rod assembly 10 in accordance with the present invention, its operation will now be briefly reviewed. The operation will be described in conjunction with the illustrated use of the pull rod assembly with the shaker drive 22 and container trough 12 wherein the inner pull rod 30 is connected to the shaker drive and the outer pull rod 32 is connected to the container trough 12 through the bracket 26. It will be appreciated, however, that the pull rod assembly 10 may find application in systems other than the illustrated furnace charger system of FIG. 1. Further, the inner pull rod member 30 may be connected to a driven member and the outer pull rod member 32 connected to a drive member.

Assuming that the pull rod assembly 10 is in its fully telescoped condition and that a load has been deposited within the container trough 12 and it is desired to move the container trough from its loading position to a discharge position, as shown in phantom in FIG. 1, the control means 114 is actuated to move the pawl release bar to the right, as considered in FIGS. 2 and 6, to raise the pawl 98 by engagement of the lift cam surface 120a with the pawl lift pin 102. The channel 118 within the pawl housing 92 has a stop surface 124 therein which limits movement of the pawl release bar 116 in a right-hand direction, the stop surface 124 being located so that when the pawl release bar 116 is in its right-hand position, the pawl lift pin 102 will be disposed on an upper horizontal surface 120c of the lift cam 120. The pawl 98 is thus released from engagement with the rung designated 38a. A cover plate 126 is mounted on the pawl housing 92 and partially overlies the open end of channel 118 opposite the stop surface 124 so as to limit movement of the release bar 116 in the left-hand direction relative to the pawl housing.

With the pawl 98 thus raised by the pawl release bar 116, movement of the pull rod assembly 10 toward the left, as considered in FIG. 1, upon energizing the shaker drive 22 will effect a corresponding movement of the container trough 12 due to engagement of the pawl 100 by the rung 38a of the inner pull rod member 30. As the output crank 24 of the shaker drive rotates in a direction to move the inner pull rod member 30 longitudinally in a right-hand direction, the mass of the container trough 12 will inhibit a corresponding movement of the outer pull rod member 32 so that the rung designated 38b will slide along the cam surface 100a of pawl 100 to raise pawl 100 and allow the rung 38b to move to a position formerly occupied by rung 38a, considered relative to the outer pull rod 32. In this manner, the inner pull rod 30 moves axially relative to the outer pull rod a distance equal to the "throw" or stroke of the eccentric output crank arm 24. As noted, the longitudinal spacing between adjacent rungs 38 along the inner pull rod 30 is slightly less than the throw of the output crank arm 24. As a result, the rung 38b which initially underlaid the pawl 100 will pass to a position clear of the pawl 100 whereafter pawl 100 will again fall by gravity to a position wherein its lower cam surface 100a rests on the pawl 38c adjacent the rung 38b upon which the pawl 100 formerly rested. In this position, the surface 100c of pawl 100 is disposed to abut the opposing vertical side edge surface of rung 38b. Thereafter, movement of the crank arm 24 in a direction to effect a left-hand longitudinal movement of the inner pull rod member 30 will cause a corresponding left-hand movement of the outer pull rod member 32 and the associated container trough 12 due to engagement of the newly located rung 38b with the pawl 100. This incremental extension of the inner and outer pull rod members 30 and 32 relative to each other, the corresponding leftward movement of trough 12, continues until either the control means 114 is actuated to move the pawl release bar 116 to its neutral position allowing the pawls 98 and 100 to interlock with one of the intermediate rungs 38 on the inner pull rod member, or until the stop plate 54 engages the pawl housing 92 which prevents further extension. As noted, in the latter position the pawl 100 engages the pin 112 to prevent the pawl from becoming wedged against the left-most rung 38 in a manner as would inhibit subsequent raising and release of pawl 100.

During the described extension of the inner rod member 30 relative to the outer rod member 32 and the simultaneous left-hand movements of the pull rod assembly 10 to move the trough 12 toward the process vessel 14, the forces applied to the container trough 12 are transmitted through the shock absorber means defined by the coil spring 72 and the resilient bushings 80. In this manner, relatively small shock forces are absorbed by the bushings 80 while larger shock forces compress the compression spring 72 so that the impact forces acting on the trunion pins 84 and the inner and outer pull rod members are substantially reduced. It will be appreciated that for some applications, the shock absorbing feature of the connecting means 62 may be eliminated whereupon the outer pull rod member 32 can be directly connected to the driven member.

Upon moving the container trough 12 to a discharge position within the processing vessel 14 by effecting the desired extension of the inner and outer pull rod members 30 and 32 relative to each other, continued rotation of the output crank arm 24 will effect longitudinal reciprocating movement of the container trough in a manner to effect discharge of the processing material therefrom into the vessel 14 in a known manner.

When it is desired to retract or return the container trough 12 to its initial loading position, such as after discharging the process material into the vessel 14, the control means 114 is actuated to move the pawl release bar 116 to a left-hand position, as considered in FIGS. 2 and 6, whereby to raise the pawl 100 while allowing the pawl 98 to remain in its lowered position. Thereafter, rotation of the output crank arm 24 of the shaker drive 22 will impart alternate axial forces to the inner pull rod member 30 which are operative to effect right-hand axial movement of the outer pull rod member 32. Each time the inner pull rod member 30 is subjected to an axial force moving it to the left, a rung 38 will slide along the lower cam surface 98a on pawl 98 to raise pawl 98 and allow the sliding rung to clear pawl 98, whereafter pawl 98 again drop by gravity to engage the next rung. After each rung 38 passes under pawl 98, the pawl drops to a position wherein the next right-hand axial movement of the inner pull rod member will cause the surface 98c on pawl 98 to be engaged by the previously passed rung 38, which may be termed an abutment element, to effect a corresponding right-hand telescoping movement of the outer pull rod member 32 relative to the inner rod member. The mass of the container trough 12 again inhibits left-hand movement of the outer pull rod member as the inner pull rod member is moved to the left. This relative telescoping of the inner and outer pull rod members will continue and move the container trough 12 in the right-hand direction until the release bar 116 is moved to a centered position releasing both pawls 98 and 100 or until the stop plate 44 on the inner pull rod member abuts the pawl housing 92, the latter action defining the right-hand limit of movement of the container trough. It will be appreciated that the control means 114 may be actuated when the inner and outer pull rod members are at any intermediate position between their fully extended and fully telescoped positions to effect interlocking between the inner and outer pull rod members. In furnace charged systems, for example, it may be desirable to move the trough 12 to a discharge position, effect reciprocating movement to discharge some of the process material, retract the trough to an intermediate position and reciprocate it to break up lumps of the material, and then return the trough to its discharge position to complete discharge whereafter the trough is returned to its loading position.

Thus, in accordance with the present invention, a pull rod assembly is provided which is capable of effecting movement of a driven member in response to a drive member by recurrent "stepping" and interlocking between inner and outer pull rod members whereby to effect extension or retraction of the overall length of the pull rod assembly as the driven pull rod member is subjected to longitudinal reciprocating movement. Upon establishing a selected length of the pull rod assembly, as at either its fully extended, fully retracted or some intermediate position, the inner and outer pull rod members are affixed in interlocked relation whereafter the pull rod assembly moves as a unitary connecting element directly responsive to the movement of the drive member.

While a preferred embodiment of the present invention has been illustrated and described, it will be understood to those skilled in the art that changes and modifications may be made therein without departing from the invention in itsbroader aspects. Various features of the invention are defined in the following claims.

What is claimed is:

1. A pull rod assembly for use in transmitting reciprocating motion to a driven member from a drive means with said pull rod assembly being alternately subjected to axial forces tending to elongate said rod assembly and axial forces tending to foreshorten said pull rod assembly, said pull rod assembly including a first rod member having means generally adjacent one end thereof for connection to said drive member, a second rod member having means for connecting said second rod member to said driven member, said first and second rod members being disposed in telescoping relation and adapted for axial movement relative to each other, connecting means carried by one of said first and second rod members for interlocking relation with the other of said rod members, said connecting means including pawl means selectively operable to release said first and second rod members in a manner to facilitate axial movement of said rod members relative to each other in first axial directions to either extend or shorten the overall length of said pull rod assembly while preventing movement of said pull rod members in opposite axial directions, and control means operatively associated with said pawl means and adapted to effect selective interlocking of said rod members for unitary movement or to effect selective release of said rod members to facilitate extension or shortening of the overall length of said pull rod assembly.

2. A pull rod assembly for use in connecting a drive member and a driven member to effect movement of the driven member in response to movement of the drive member, said pull rod assembly comprising, in combination, a first rod member having means thereon for connecting said first rod member to one of said drive and driven members, a second rod member having means thereon for connecting said second rod member to the other of said drive and driven members, said first and second rod members being operatively associated in a manner to facilitate axial movement of the rod members relative to each other, connecting means carried by one of said first and second rod members and cooperable with the other of said rod members to effect selective interlocking relation between said rod members so that axial movement of one of said pull rod members effects a corresponding movement of the other pull rod member, said connecting means being operable in a first condition to release said other of said rod members in a manner to facilitate movement of said rod members in first axial directions relative to each other to extend the overall length of said rod assembly but preventing movement of said rod members in opposite axial directions, and operable in a second condition to release said other of said rod members in a manner to facilitate axial movement of said rod members to shorten the overall length of said rod assembly but preventing movement of said rod members in opposite axial directions, and control means operatively associated with said connecting means for effecting said selective interlocking relation between said first and second rod members and for effecting operation of said connecting means in said first and second conditions to enable selective extension and shortening of said pull rod assembly.

3. A pull rod assembly as defined in claim 2 wherein said other of said rod members has a plurality of discrete abutment means spaced longitudinally therealong, said connecting means being selectively cooperable with said abutment means to facilitate said interlocking between said rod members and to facilitate said extension and shortening of said pull rod assembly.

4. A pull rod assembly as defined in claim 3 wherein said abutment means comprise a plurality of discrete rungs equidistantly spaced along the longitudinal length of said first rod member, and wherein said connecting means is carried by said second rod member and includes a pair of pawls adapted to engage a selected one of said rungs in locking relation therewith to maintain said first and second rod members in interlocked juxtaposed relation, said pawls being adapted for selected release from said rungs to effect said extension and shortening of said rod assembly, and said control means being cooperatively associated with said pawls and operative to effect selective engagement of said pawls with said rungs.

5. A pull rod assembly as defined in claim 4 wherein said connecting means includes a pawl housing carried by said second rod member, said pawls being supported by said pawl housing for movement in directions generally normal to the longitudinal axis of said second pull rod, said pawls being spaced longitudinally of said second rod member a distance sufficient to receive single ones of said rungs therebetween, said control means including a pawl release bar cooperative with said pawls to selectively move said pawls to positions disabling engagement of said pawls with said rungs on said first rod member.

6. A pull rod assembly as defined in claim 3 wherein said pawl release bar includes a lift cam having lift cam surfaces thereon, and wherein each of said pawls has means thereon cooperative with a selected one of said cam surfaces such that movement of said pawl release bar in a first direction is operative to disable one of said pawls from locking relation with a rung on said first rod member, and movement of said pawl release bar in an opposite direction is operative to release said disabled pawl while disabling the other of said pawls from the associated rung on said first rod member.

7. A pull rod assembly as defined in claim 2 wherein said means on said second rod member for connecting said second pull rod member to said driven member includes shock absorbing means whereby the impact force transmitted to said driven member through said pull rod assembly is at least partially dissipated by said shock absorbing means.

8. A pull rod assembly as defined in claim 2 wherein said first rod member has abutment means mounted thereon adjacent the opposite ends thereof for cooperation with said second rod member to limit the extent of maximum extension and retraction of said first and second pull rod members relative to each other.

9. A pull rod assembly as defined in claim 4 wherein said first rod member includes a pair of parallel spaced plates having said rungs secured therebetween with the axes of said rungs substantially perpendicular to the planes of said plates, said pawls being movable in directions generally normal to the axes of said rungs and having widths, transverse to their directions of movement, greater than the spacing between said rungs whereby said pawls are prevented from being wedged between adjacent rungs on said first pull rod member.

10. A pull rod assembly as defined in claim 9 wherein said pawls are supported for longitudinal sliding movement and are biased toward said rungs on said first pull rod member by gravity, each of said pawls having a lower cam surface thereon engageable with a rung when allowed to engage said rung under force of gravity, said cam surfaces having configurations so that when the cam surface of a pawl is disposed in engagement with a rung on said first pull rod member, said first rod member may move axially in one direction relative to that pawl without moving said pawl in a corresponding direction, but cannot move axially in an opposite direction without effecting a corresponding movement of the associated pawl.

* * * * *

UNITED STATES PATENT AND TRADEMARK OFFICE
CERTIFICATE OF CORRECTION

PATENT NO. : 4,040,308
DATED : August 9, 1977
INVENTOR(S) : Haim J. Kamner

It is certified that error appears in the above–identified patent and that said Letters Patent are hereby corrected as shown below:

Col. 1, line 18, "laod" should be --load--.

Col. 3, line 66, "FIG. 2" should be --FIG. 1--.

Col. 6, line 65, "surface" should be --surfaces--.

Col. 7, line 56, "release bar" should be --release bar 116--.

Col. 9, line 20, "98 again" should be --98 will again--.

Col. 9, line 44, "furnace charged" should be --furnace charger--.

Col. 10, line 3, "itsbroader" should be --its broader--.

Col. 11, line 32, "3" should be --5--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks